United States Patent
Mohammed et al.

(10) Patent No.: US 10,961,927 B2
(45) Date of Patent: Mar. 30, 2021

(54) ENGINE RESPONSE TO LOAD SHEDDING BY MEANS OF A SKIP-SPARK/FUEL STRATEGY

(71) Applicant: Cummins Inc., Columbus, IN (US)

(72) Inventors: Hasan Mohammed, Charleston, SC (US); Matthew W. Isaacs, Monks Corner, SC (US)

(73) Assignee: Cummins Inc., Columbus, IN (US)

( * ) Notice: Subject to any disclaimer, the term of this patent is extended or adjusted under 35 U.S.C. 154(b) by 27 days.

(21) Appl. No.: 16/385,407

(22) Filed: Apr. 16, 2019

(65) Prior Publication Data

US 2019/0242309 A1 Aug. 8, 2019

Related U.S. Application Data

(63) Continuation of application No. PCT/US2016/063068, filed on Nov. 21, 2016.

(51) Int. Cl.
*F02D 41/00* (2006.01)
*F02D 17/02* (2006.01)
(Continued)

(52) U.S. Cl.
CPC ......... *F02D 41/0027* (2013.01); *F02D 17/02* (2013.01); *F02D 19/024* (2013.01); *F02D 19/0647* (2013.01); *F02D 19/082* (2013.01); *F02D 19/105* (2013.01); *F02D 41/0087* (2013.01); *F02P 5/045* (2013.01); *F02P 5/15* (2013.01); *F02D 2200/10* (2013.01); *F02M 37/0064* (2013.01)

(58) Field of Classification Search
CPC ........ F02D 9/06; F02D 19/0647; F02D 17/02; F02D 41/0027; F02D 41/0082; F02D 41/0087; F02D 41/123
See application file for complete search history.

(56) References Cited

U.S. PATENT DOCUMENTS

| 5,553,575 A | 9/1996 | Beck et al. |
| 5,734,100 A | 3/1998 | Kishimoto et al. |

(Continued)

FOREIGN PATENT DOCUMENTS

| JP | 2009281176 | 12/2009 |
| WO | 2016060994 | 4/2016 |

OTHER PUBLICATIONS

Extended EP Search Report, EP Appln. No. 16921744.5, dated Jun. 2, 2020, 9 pgs.
(Continued)

*Primary Examiner* — Audrey K Bradley
(74) *Attorney, Agent, or Firm* — Taft Stettinius & Hollister LLP

(57) ABSTRACT

Systems, apparatus and methods include control techniques for controlling operation of pre-mixed internal combustion engines in response to a load shedding event. The control techniques determine, in response to the load shedding event, a number of cycles in which to skip combustion of the fuel in the at least one cylinder based on an air-fuel ratio limit in the exhaust flow, prevent combustion of the fuel in the at least one cylinder during the number of skipped cycles, and combust the fuel in the at least one cylinder each time the number of skipped cycles are complete.

21 Claims, 3 Drawing Sheets

(51) Int. Cl.
*F02D 19/02* (2006.01)
*F02D 19/10* (2006.01)
*F02D 19/06* (2006.01)
*F02D 19/08* (2006.01)
*F02P 5/04* (2006.01)
*F02P 5/15* (2006.01)
*F02M 37/00* (2006.01)

(56) References Cited

U.S. PATENT DOCUMENTS

| | | |
|---|---|---|
| 8,613,272 B2 | 12/2013 | Mathews et al. |
| 9,212,610 B2 | 12/2015 | Chen et al. |
| 9,228,536 B2 | 1/2016 | zur Loye et al. |
| 2002/0116917 A1 | 8/2002 | Glugla et al. |
| 2010/0050993 A1 | 3/2010 | Zhao et al. |
| 2012/0298070 A1 | 11/2012 | Akinyemi et al. |
| 2013/0060446 A1 | 3/2013 | Kim et al. |
| 2014/0318496 A1 | 10/2014 | Yoshida et al. |
| 2015/0152795 A1 | 6/2015 | Zhao et al. |
| 2015/0167590 A1* | 6/2015 | Otto zur Loye .... F02D 41/0025 60/601 |
| 2016/0010602 A1 | 1/2016 | Kitchen |
| 2016/0258376 A1 | 9/2016 | Jammoussi et al. |

OTHER PUBLICATIONS

Search Report and Written Opinion, PCT Appln. No. PCT/US16/63068, dated Feb. 15, 2017, 7 pgs.

* cited by examiner

ENGINE RESPONSE TO LOAD SHEDDING BY MEANS OF A SKIP-SPARK/FUEL STRATEGY

CROSS-REFERENCE TO RELATED APPLICATION

The present application is a continuation of International Patent App. No. PCT/US2016/063068 filed on Nov. 21, 2016, which is incorporated herein by reference.

FIELD OF THE INVENTION

The present invention relates generally to pre-mixed internal combustion engines, and more particularly is concerned with systems and methods for reducing or eliminating exhaust manifold over-pressure events for such internal combustion engines while simultaneously minimizing engine overspeeding.

BACKGROUND

Rapid load shedding during operation of pre-mixed spark-ignited and/or dual fuel engines results in a rapid increase in engine speed. In order to slow the engine, existing control strategies prevent combustion in the cylinders during the power stroke. However, for pre-mixed and dual fuel type engines, this can lead to exhaust manifold over-pressure (EMOP) events because the exhaust lambda (λ), or air-fuel ratio (AFR), is below its flammability limits. Thus, there remains a need for additional improvements in systems and methods for controlling engine overspeeding while avoiding EMOP events in response to a load shedding event.

SUMMARY

Unique systems and methods are disclosed for controlling operation of an internal combustion engine in response to a load shedding event. A load shedding event occurs when there is a sudden decrease in the load placed on the engine or requested from the engine. Examples of load shedding events include a sudden shutdown of the engine, mechanically disconnecting the engine from the load (for example by disengaging the clutch), an electrical load on a generator driven by the engine is suddenly reduced, sudden reduction in commanded load (for example by lifting of an accelerator pedal), and shifting of the transmission into neutral.

EMOP events cause an unintended energy release in the exhaust system and may, for example, increase emissions, damage aftertreatment components, and/or cause unintended combustion that damages exhaust system components. The control techniques disclosed herein mitigate or reduce EMOP events by controlling the amount of uncombusted pre-mixed fuel such as gaseous fuel passing into the exhaust and/or aftertreatment system based on real time limits of exhaust gas flammability and the control techniques can simultaneously or alternatively help minimize the overspeeding of the engine in response to determination or detection of a load shedding event.

In one form the load shedding event is an indication that the torque demanded from the engine is less than the current torque output by more than a threshold amount. In one embodiment, the control techniques includes only firing spark plugs of a spark ignited engine only after a calculated or determined number of cycles of each cylinder involved are skipped so that an exhaust AFR limit is not violated. In another embodiment for a dual fuel engine, the control technique includes injecting diesel fuel only after a calculated or determined number of cycles are skipped such that the AFR limit is not violated. It is proposed that the control techniques can be applied on a cylinder-by-cylinder basis, on more than one but less than all cylinders of the engine, or on all cylinders of the engine. The exhaust AFR limit is dynamic based on a function of assumed or measured exhaust temperature and fuel composition.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DESCRIPTION OF ILLUSTRATIVE EMBODIMENTS

Figure 1:
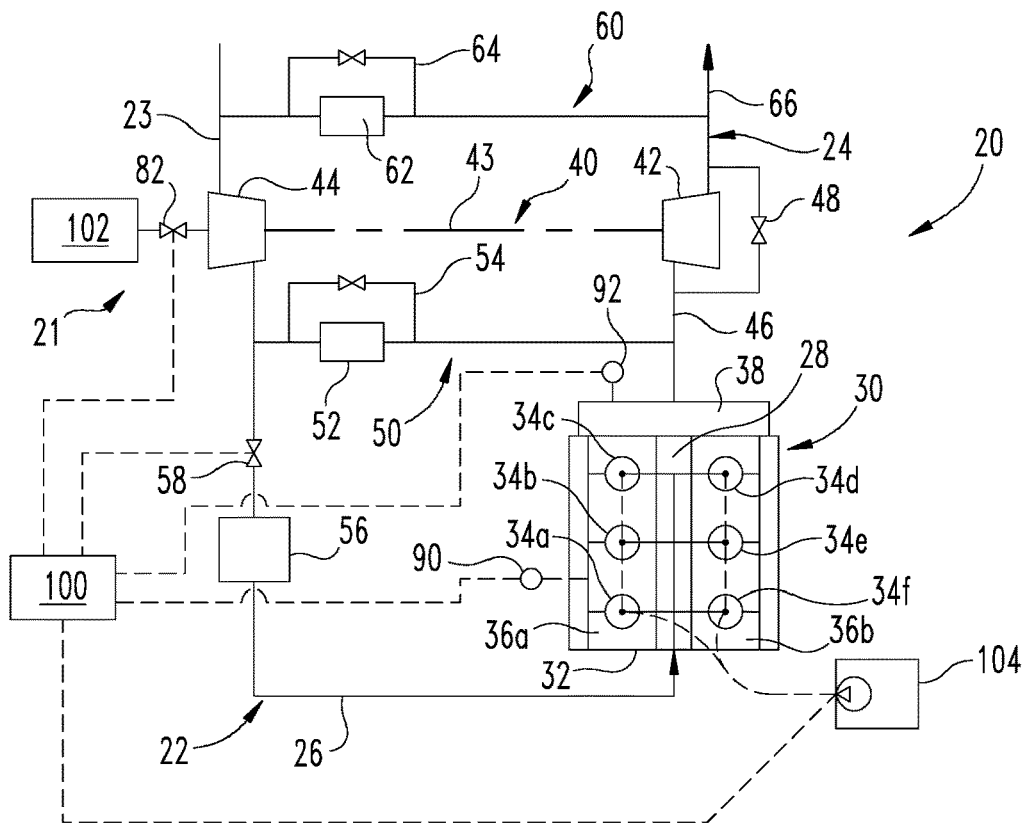
FIG. 1 is a schematic illustration of a portion of an internal combustion engine system.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

With reference to FIG. 1, an internal combustion engine system 20 is illustrated in schematic form. A fueling system 21 is also shown in schematic form that is operable with internal combustion engine system 20 to provide fueling for engine 30 from a first fuel source 102. In one embodiment, only one fuel source 102 is provided and is located so that the fuel is pre-mixed with the charge flow upstream of the combustion chambers of engine cylinders. In another embodiment, fueling system 21 includes an optional second fuel source 104 for providing fueling, and internal combustion engine system 20 is a dual fuel system.

Internal combustion engine system 20 includes engine 30 connected with an intake system 22 for providing a charge flow to engine 30 and an exhaust system 24 for output of exhaust gases in an exhaust flow. In certain embodiments, the engine 30 includes a pre-mix internal combustion engine in which a gaseous fuel flow is pre-mixed with the charge flow. The gaseous fuel can be, for example, natural gas, bio-gas, methane, propane, ethanol, producer gas, digester gas, field gas, liquefied natural gas, compressed natural gas, or landfill gas.

In another embodiment, engine 30 includes a lean combustion engine such as a diesel cycle engine that uses a liquid fuel in second fuel source 104 such as diesel fuel and a gaseous fuel in first fuel source 102 such as natural gas. The gaseous fuel can be, for example, natural gas, bio-gas, methane, propane, ethanol, producer gas, digester gas, field gas, liquefied natural gas, compressed natural gas, or landfill gas. However, other types of liquid and gaseous fuels are not precluded, such as any suitable liquid fuel and gaseous fuel. In the illustrated embodiment, the engine 30 includes six cylinders 34*a*-34*f* in a two cylinder bank 36*a*, 36*b* arrangement. However, the number of cylinders (collectively referred to as cylinders 34) may be any number, and the arrangement of cylinders 34 unless noted otherwise may be any arrangement including an in-line arrangement, and is not limited to the number and arrangement shown in FIG. 1.

Engine 30 includes an engine block 32 that at least partially defines the cylinders 34. A plurality of pistons, such as piston 70 shown in FIG. 2, may be slidably disposed within respective cylinders 34 to reciprocate between a top-dead-center position and a bottom-dead-center position while rotating a crankshaft 78. Each of the cylinders 34, its respective piston 70, and the cylinder head 72 form a combustion chamber 74. In the illustrated embodiment, engine 30 includes six such combustion chambers 74. However, it is contemplated that engine 30 may include a greater or lesser number of cylinders 34 and combustion chambers 74 and that cylinders 34 and combustion chambers 74 may be disposed in an "in-line" configuration, a "V" configuration, or in any other suitable configuration.

In one embodiment, engine 30 is a four stroke engine. That is, for each complete engine combustion cycle (i.e., for every two full crankshaft 78 rotations), each piston 74 of each cylinder 34 moves through an intake stroke, a compression stroke, a combustion or power stroke, and an exhaust stroke. Thus, during each complete combustion cycle for the depicted six cylinder engine, there are six strokes during which air is drawn into individual combustion chambers 74 from intake supply conduit 26 and six strokes during which exhaust gas is supplied to exhaust manifold 38. As discussed further below, the present invention determines a number of these cycles in which to skip combustion in response to a load shedding event to reduce or prevent EMOP events and improve control over engine overspeed, and to provide a combustion event in the cylinder(s) after the number of skipped cycles are complete and before initiating the next number skipped cycles in which combustion is skipped.

The engine 30 includes cylinders 34 connected to the intake system 22 to receive a charge flow and connected to exhaust system 24 to release exhaust gases produced by combustion of the fuel(s). Engine 30 may include one or more variable valve timing (VVT) arrangements, such as a cam phase or variable valve lift. Exhaust system 24 may provide exhaust gases to a turbocharger 40, although a turbocharger is not required. In still other embodiments, multiple turbochargers are included to provide high pressure and low pressure turbocharging stages that compress the intake flow.

Furthermore, exhaust system 24 can be connected to intake system 22 with one or both of a high pressure exhaust gas recirculation (EGR) system 50 and a low pressure EGR system 60. EGR systems 50, 60 may include a cooler 52, 62 and bypass 54, 64, respectively. In other embodiments, one or both of EGR systems 50, 60 are not provided. When provided, EGR system(s) 50, 60 provide exhaust gas recirculation to engine 30 in certain operating conditions. In any EGR arrangement during at least certain operating conditions, at least a portion the exhaust output of cylinder(s) 34 is recirculated to the engine intake system 22.

In the high pressure EGR system 50, the exhaust gas from the cylinder(s) 34 takes off from exhaust system 24 upstream of turbine 42 of turbocharger 40 and combines with intake flow at a position downstream of compressor 44 of turbocharger 40 and upstream of an intake manifold 28 of engine 30. In the low pressure EGR system 60, the exhaust gas from the cylinder(s) 34*a*-34*f* takes off from exhaust system 24 downstream of turbine 42 of turbocharger 40 and combines with intake flow at a position upstream of compressor 44 of turbocharger 40. The recirculated exhaust gas may combine with the intake gases in a mixer (not shown) of intake system 22 or by any other arrangement. In certain embodiments, the recirculated exhaust gas returns to the intake manifold 28 directly.

Intake system 22 includes one or more inlet supply conduits 26 connected to an engine intake manifold 28, which distributes the charge flow to cylinders 34 of engine 30. Exhaust system 24 is also coupled to engine 30 with engine exhaust manifold 38. Exhaust system 24 includes an exhaust conduit 46 extending from exhaust manifold 32 to an exhaust valve. In the illustrated embodiment, exhaust conduit 46 extends to turbine 42 of turbocharger 40. Turbine 42 includes a valve such as controllable wastegate 48 or other suitable bypass that is operable to selectively bypass at least a portion of the exhaust flow from turbine 42 to reduce boost pressure and engine torque under certain operating conditions. In another embodiment, turbine 42 is a variable geometry turbine with a size-controllable inlet opening. In another embodiment, the exhaust valve is an exhaust throttle that can be closed or opened.

An aftertreatment system (not shown) can be connected with an outlet conduit 66. The aftertreatment system may include, for example, three way catalysts (TWC), oxidation devices (DOC), particulate removing devices (DPF, CDPF), constituent absorbers or reducers (SCR, AMOX, LNT), reductant systems, and other components if desired.

In one embodiment, exhaust conduit 46 is flow coupled to exhaust manifold 32, and may also include one or more intermediate flow passages, conduits or other structures. Exhaust conduit 46 extends to turbine 42 of turbocharger 40. Turbocharger 40 may be any suitable turbocharger known in the art, including variable-geometry turbine turbochargers and waste-gated turbochargers. Turbocharger 40 may also include multiple turbochargers. Turbine 42 is connected via a shaft 43 to compressor 44 that is flow coupled to inlet supply conduit 26.

Compressor 44 receives fresh air flow from intake air supply conduit 23. Fuel source 102 may also be flow coupled at, downstream, or upstream of the inlet to compressor 44 which provides a pre-mixed charge flow to cylinders 34. Intake system 22 may further include a compressor bypass (not shown) that connects a downstream or outlet side of compressor 44 to an upstream or inlet side of compressor 44. Inlet supply conduit 26 may include a charge air cooler 56 downstream from compressor 44 and intake throttle 58. In another embodiment, a charge air cooler 56 is located in the intake system 22 upstream of intake throttle 58. Charge air cooler 56 may be disposed within inlet air supply conduit 26 between engine 30 and compressor 44, and embody, for example, an air-to-air heat exchanger, an air-to-liquid heat exchanger, or a combination of both to facilitate the transfer of thermal energy to or from the flow directed to engine 30.

In operation of internal combustion engine system 20, fresh air is supplied through inlet air supply conduit 23. The fresh air flow or combined flows can be filtered, unfiltered, and/or conditioned in any known manner, either before or after mixing with the EGR flow from EGR systems 50, 60 when provided. The intake system 22 may include components configured to facilitate or control introduction of the charge flow to engine 30, and may include intake throttle 58, one or more compressors 44, and charge air cooler 56. The intake throttle 58 may be connected upstream or downstream of compressor 44 via a fluid passage and configured to regulate a flow of atmospheric air and/or combined air/EGR flow to engine 30. Compressor 44 may be a fixed or variable geometry compressor configured to receive air or air and fuel mixture from fuel source 102 and compress the air or combined flow to a predetermined pressure level before engine 30. The charge flow is pressurized with compressor 44 and sent through charge air cooler 56 and supplied to engine 30 through intake supply conduit 26 to engine intake manifold 28.

Fuel system 21 is configured to provide either fuelling from a single fuel source or, in another embodiment, dual fuelling of engine 30 from one or both of fuel sources 102, 104. In one dual fuel embodiment, fuel system 21 includes first fuel source 102 and second fuel source 104. First fuel source 102 is connected to intake system 22 with a mixer or connection at or adjacent an inlet of compressor 44. Second fuel source 104 is configured to provide a flow of a flow of liquid fuel to cylinders 34 with one or more injectors at or near each cylinder. In certain embodiments, the cylinders 34 each include at least one direct injector 76 for delivering fuel to the combustion chamber 74 thereof from a liquid fuel source, such as second fuel source 104. In addition, at least one or a port injector at each cylinder or a mixer at an inlet of compressor 44 can be provided for delivery or induction of fuel from the first fuel source 102 with the charge flow delivered to cylinders 34.

A direct injector, as utilized herein, includes any fuel injection device that injects fuel directly into the cylinder volume (combustion chamber), and is capable of delivering fuel into the cylinder volume when the intake valve(s) and exhaust valve(s) are closed. The direct injector may be structured to inject fuel at the top of the cylinder or laterally of the cylinder. In certain embodiments, the direct injector may be structured to inject fuel into a combustion prechamber. Each cylinder 34, such as the illustrated cylinders 34 in FIG. 2, may include one or more direct injectors 76 in the duel fuel embodiment. The direct injectors 76 may be the primary fueling device for a liquid second fuel source 104 for the cylinders 34.

A port injector, as utilized herein, includes any fuel injection device that injects fuel outside the engine cylinder in the intake manifold to form the air-fuel mixture. The port injector injects the fuel towards the intake valve. During the intake stroke, the downwards moving piston draws in the air/fuel mixture past the open intake valve and into the combustion chamber. Each cylinder 34 may include one or more port injectors (not shown). In one embodiment, the port injectors may be the primary fueling device for first fuel source 102 to the cylinders 34. In another embodiment, the first fuel source 102 can be connected to intake system 22 with a mixer upstream of intake manifold 28, such as at the inlet or upstream of compressor 44.

In certain dual fuel embodiments, each cylinder 34 includes at least one direct injector that is capable of providing all of the designed primary fueling amount from fuel source 104 for the cylinders 34 at any operating condition. First fuel source 102 provides a flow of a gaseous fuel to each cylinder 34 through a port injector or a natural gas connection upstream of intake manifold 28 to provide a second fuel flow (in the dual fuel embodiment) or the sole fuel flow (in single fuel source embodiments) to the cylinders 34 to achieve desired operational outcomes, such as improved efficiency, improved fuel economy, improved high load operation, and other outcomes.

In the dual fuel embodiment, the fueling from the second, liquid fuel source 104 is controlled to provide the sole fueling at certain operating conditions of engine 30, and fueling from the first fuel source 102 is provided to substitute for fueling from the second fuel source 104 at other operating conditions to provide a dual flow of fuel to engine 30. In the dual fuel embodiments where the first fuel source 102 is a gaseous fuel and the second fuel source 104 is a liquid fuel, a control system including controller 100 is configured to control the flow of liquid fuel from second fuel source 104 and the flow of gaseous fuel from first fuel source 102 in accordance with engine speed, engine loads, intake manifold pressures, and fuel pressures, for example. In single fuel embodiments where the sole fuel source 102 is a gaseous fuel, a control system including controller 100 is configured to control the flow of gaseous fuel from first fuel source 102 in accordance with engine speed, engine loads, intake manifold pressures, and fuel pressures, for example.

Figure 2:
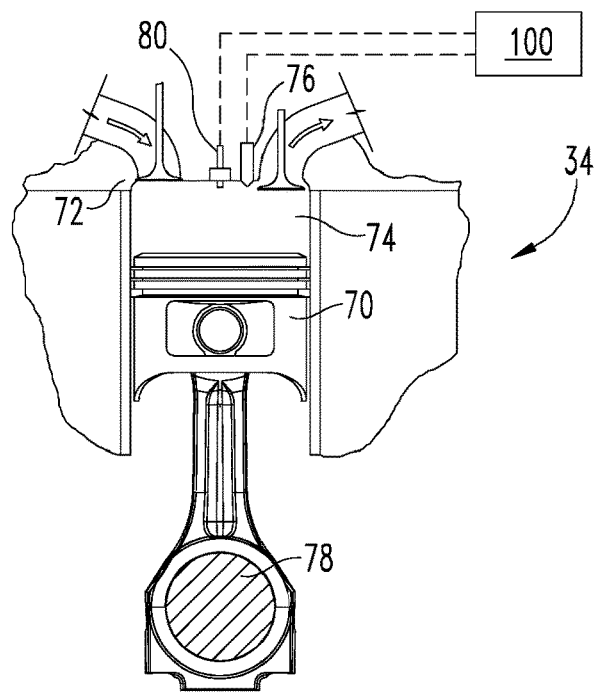
FIG. 2 is a schematic illustration of a cylinder of the internal combustion engine system of FIG. 1.

One embodiment of system 20 shown in FIG. 2 includes each of the cylinders 34 with a direct injector 76 (in dual fuel embodiment) and/or a spark plug 80, associated with each of the illustrated cylinders 34*a*-34*f* of FIG. 1. Direct injectors 76 are electrically connected with controller 100 to receive fueling commands that provide a fuel flow to the respective cylinder 34 in accordance with a fuel command determined according to engine operating conditions and operator demand by reference to fueling maps, control algorithms, or other fueling rate/amount determination source stored in controller 100. Spark plugs 80 are electrically connected with controller 100 to receive spark or firing commands that provide a spark in the respective cylinder 34 in accordance with a spark timing command determined according to engine operating conditions and operator demand by reference to fueling maps, control algorithms, or other fueling rate/amount determination source stored in controller 100.

Each of the direct injectors 76 can be connected to a fuel pump (not shown) that is controllable and operable to provide a flow or fuel from second fuel source 104 to each of the cylinders 34 in a rate, amount and timing determined by controller 100 that achieves a desired torque and exhaust output from cylinders 34. The fuel flow from first fuel source 102 can be provided to an inlet of compressor 44 or to port injector(s) upstream of cylinders 34. A shutoff valve 82 can be provided in fuel line 108 and/or at one or more other locations in fuel system 21 that is connected to controller 100. The gaseous fuel flow is provided from first fuel source 102 in an amount determined by controller 100 that achieves a desired torque and exhaust output from cylinders 34.

Controller 100 can be connected to actuators, switches, or other devices associated with fuel pump(s), shutoff valve 82, intake throttle 58, wastegate 48 or an inlet to a VGT or an exhaust throttle, spark plugs 80, and/or injectors 76 and configured to provide control commands thereto that regulate the amount, timing and duration of the flows of the gaseous and/or liquid fuels to cylinders 34, the charge flow, and the exhaust flow to provide the desired torque and exhaust output. In addition, controller 100 can be connected to engine 30 and configured to detect a load shedding event associated with engine 30 during operation of engine 30.

A load shedding event can be detected by, for example, a threshold reduction in load applied to engine 30, a threshold reduction in power demanded from engine 30, a threshold reduction in torque in an output shaft connected to engine, and/or a threshold or sudden increase in engine speed or the engine speed. Accordingly, one or more engine sensors 90 can be connected to controller 110 and operable to provide operating signals indicating one or more operating parameters or conditions of engine 30. The threshold reduction in applied load, demanded power, torque reduction and/or threshold engine speed increase or rate of engine speed increase indicating a load shedding event can correspond to variances from nominal values that are encountered during typical, normal or expected operation of the engine 30.

As discussed above, the positioning of each of actuators, switches, or other devices associated with fuel pump(s), shutoff valve 82, intake throttle 58, wastegate 48 or an inlet to a VGT or an exhaust throttle, spark plugs 80, and/or injectors 76 can be controlled via control commands from controller 100. In certain embodiments of the systems disclosed herein, controller 100 is structured to perform certain operations to control engine operations and fueling of cylinders 34 with fueling system 21 to provide the desired engine speed and torque outputs and to reduce or eliminate EMOP events.

In certain embodiments, the controller 100 forms a portion of a processing subsystem including one or more computing devices having memory, processing, and communication hardware. The controller 100 may be a single device or a distributed device, and the functions of the controller 100 may be performed by hardware or software. The controller 100 may be included within, partially included within, or completely separated from an engine controller (not shown). The controller 100 is in communication with any sensor or actuator throughout the systems disclosed herein, including through direct communication, communication over a datalink, and/or through communication with other controllers or portions of the processing subsystem that provide sensor and/or actuator information to the controller 100.

The controller 100 includes stored data values, constants, and functions, as well as operating instructions stored on computer readable medium. Any of the operations of exemplary procedures described herein may be performed at least partially by the controller. Other groupings that execute similar overall operations are understood within the scope of the present application. Modules may be implemented in hardware and/or on one or more computer readable media, and modules may be distributed across various hardware or computer implemented. More specific descriptions of certain embodiments of controller operations are discussed herein in connection with FIGS. 3-5. Operations illustrated are understood to be exemplary only, and operations may be combined or divided, and added or removed, as well as re-ordered in whole or in part.

Certain operations described herein include operations to interpret or determine one or more parameters. Interpreting or determining, as utilized herein, includes receiving values by any method, including at least receiving values from a datalink or network communication, receiving an electronic signal (e.g., a voltage, frequency, current, or pulse-width modulation (PWM) signal) indicative of the value, receiving a software parameter indicative of the value, reading the value from a memory location on a computer readable medium, receiving the value as a run-time parameter by any means known in the art, and/or by receiving a value by which the interpreted or determined parameter can be calculated, and/or by referencing a default value that is interpreted or determined to be the parameter value.

Figure 3:
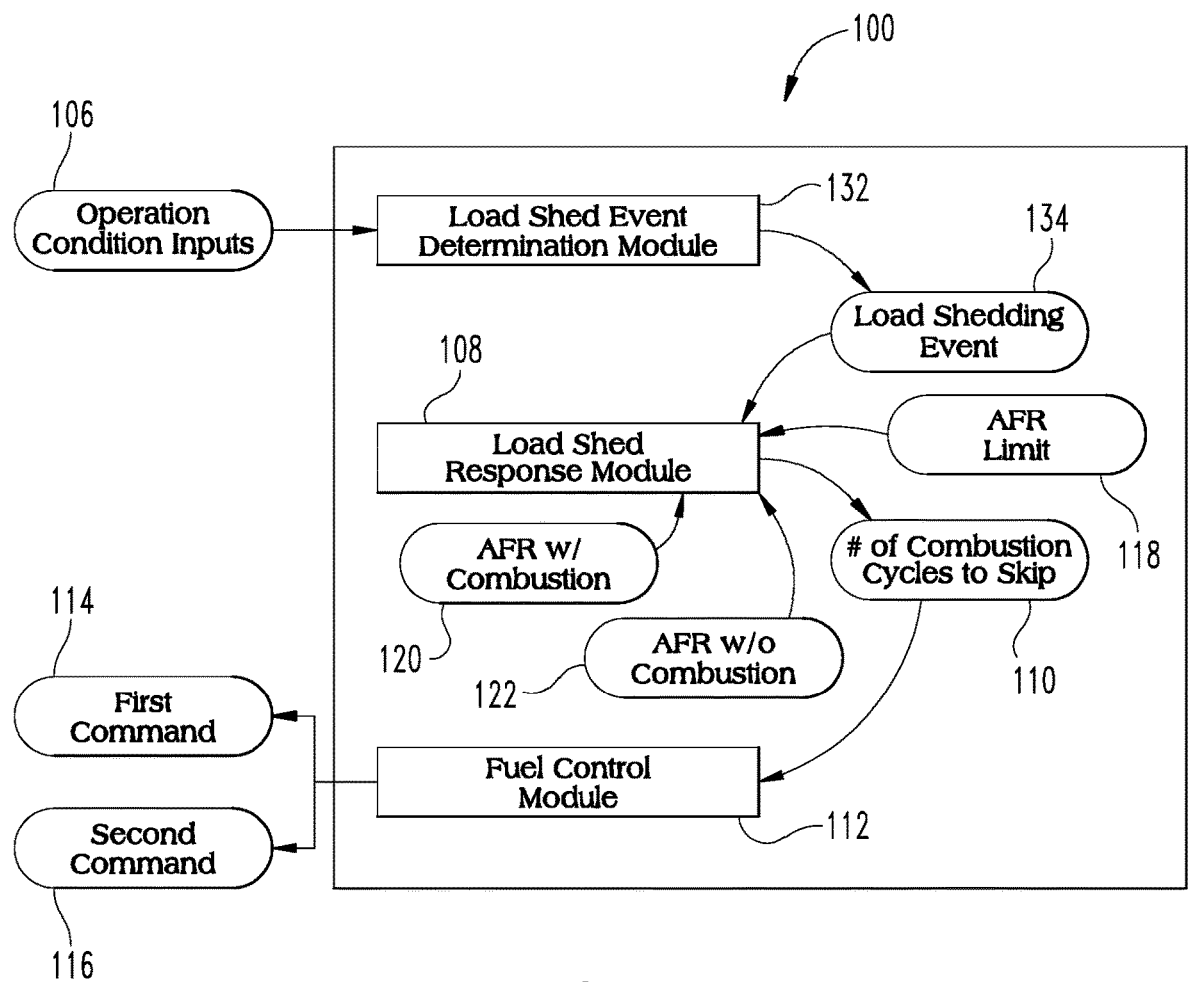
FIG. 3 is a schematic illustration of a controller for controlling the internal combustion engine system of FIG. 1.

Referring to FIG. 3, one embodiment of controller 100 is shown that includes a load shed event determination module 132 configured to determine a load shedding event 134 associated with the engine 30 in response to one more operating condition inputs 106 from sensor(s) 90 while the engine 30 is fuelled with the fuel from at least one of fuel sources 102, 104.

Controller 100 further includes a load shed response module 108 configured to determine, in response to a load shedding event determination 134, a number of combustion cycles 110 in which to skip combustion of the fuel in at least one of the plurality cylinders 34 based on an AFR limit 118 in the exhaust flow. In one embodiment, the AFR limit 118 is an exhaust flammability limit for the gaseous fuel in the exhaust flow. The exhaust flammability limit is a function of the exhaust temperature and the AFR in the exhaust flow and the fuel composition. In a specific embodiment, the AFR limit 118 in the exhaust is selected to be about 2.5. However, other AFR limits are possible depending on the engine type, operating condition, fuel type, stack temperature, and other factors.

In one embodiment, the load shed response module 108 determines the number of cylinders for skipping of spark/fire according to the AFR limit 110, the exhaust AFR with combustion 120, and exhaust AFR without combustion 122, according to the following:

$$\dot{m}_1 = y\dot{m}_3 \quad \text{Equation 1}$$

Where in Equation 1, $0 \leq y \leq 1$ and y is the fraction of total exhaust mass flow from the cutout/skipped cylinders, and $\dot{m}_1$ is the exhaust mass flow from the skipped or cutout cylinder(s) that converges with $\dot{m}_2$, which is the exhaust mass flow from the non-cutout (firing) cylinders, and $\dot{m}_3$ is the total converged exhaust mass flow from both sets of cylinders. In Equations 1-3, the subscript 1 denotes the skipped/cutout cylinders, subscript 2 denotes the fueled/fired cylinders, and subscript 3 denotes the combined outputs from skipped/cutout cylinders and the fueled/fired cylinders. Letting A denote a stoichiometric air-fuel ratio for the given fuel, and letting λ denote the excess air ratio, then solving for y:

$$y = \frac{(\lambda_2 - \lambda_3)(\lambda_1 \times A + 1)}{(\lambda_2 - \lambda_1)(\lambda_3 \times A + 1)} \quad \text{Equation 2}$$

For operating conditions where unburned hydrocarbons in the exhaust from the firing cylinders is low, Equation 2 can be approximated by:

$$y^* = \frac{\lambda_1 \times A + 1}{\lambda_2 \times A + 1} \quad \text{Equation 3}$$

Finally, for an N-cylinder engine in which n cylinders are cutout/skipped, then:

$$n = \lfloor yN \rfloor, \text{ and } n^* = \lfloor y^*N \rfloor \quad \text{Equation 4}$$

where $\lfloor \ \rfloor$ denotes the "floor" function.

The number of combustion cycles for skip of spark/fire can be determined for all cylinders 34, only a portion of cylinders 34 such as only one of cylinder bank 36a and 36b, or for only one cylinder 34 or a subset of two or more cylinders 34. In addition, the AFR for the exhaust with and without combustion can be pre-determined via calibration settings or using feedback in response to signals from, for example, an oxygen or lambda sensor 92 connected or associated with exhaust manifold 38.

Controller 100 also includes a fuel control module 112 configured to output a first command 114 to prevent combustion of the fuel in at least one cylinder 34 during the number of skipped cycles and a second command 116 to combust the fuel in the at least one cylinder each time the number of skipped cycles are complete. For example, if the number of skipped cycles is two or more, the completion of two cycles of piston 70 in the combustion chamber 74 occurs before the gaseous fuel is combusted in the cylinder, and the number of skipped cycles is repeated until the next combustion event occurs.

In one embodiment, the fuel control module 112 is configured to output a second command 116 that fires a spark plug in the at least one cylinder 34 to combust the fuel in the at least one cylinder 34 at the completion of the number of skipped cycles. In another embodiment associated with a dual fuel engine, the fuel control module 112 is configured to output a second command 116 that injects liquid fuel into the at least one cylinder 34 that provides compression ignition of the gaseous fuel in the at least one cylinder 34.

Figure 4:
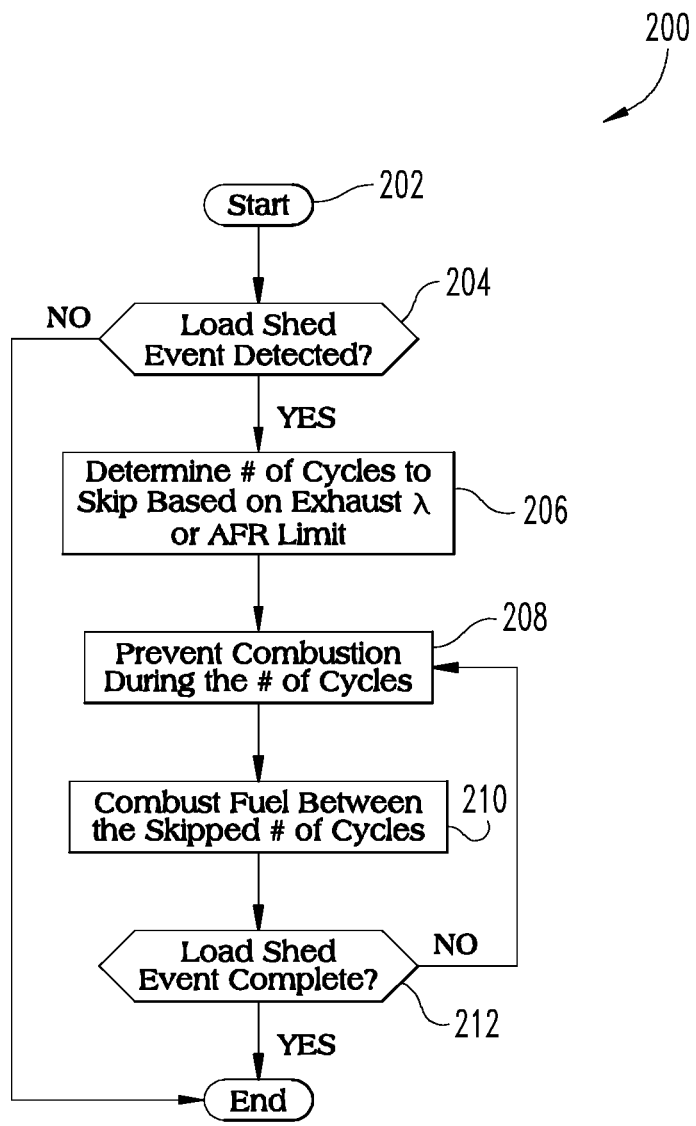
FIG. 4 is a flow diagram of procedures for controlling operation of the internal combustion engine in response to a load shedding event.

Referring now to FIG. 4, there is shown one embodiment of a procedure 200 for reducing or eliminating EMOP events and/or reducing engine overspeeding in response to a load shedding event. The schematic flow description which follows provides an illustrative embodiment of a method for providing a response to a load shedding event during a gaseous fuelling mode of operation and/or during dual fuelling mode of operation of internal combustion engine system 20. Operations illustrated are understood to be exemplary only, and operations may be combined or divided, and added or removed, as well as re-ordered in whole or part, unless stated explicitly to the contrary herein. Certain operations illustrated may be implemented by a computer such as controller 100 executing a computer program product on a non-transient computer readable storage medium, where the computer program product comprises instructions causing the computer to execute one or more of the operations, or to issue commands to other devices to execute one or more of the operations.

Procedure 200 starts at operation 202 which may begin by interpreting a key-on event, starting of engine 30, and/or by initiation by an operator or technician. Operation 202 may alternatively or additionally include interpreting a communication or other parameter indicating that operation of a sampling interval is going to re-start procedure 200 upon completion of procedure 200.

At operation 204 the operating conditions of engine 30 are determined to detect a load shedding event. The engine operating conditions that can indicate a load shedding event can include, for example, a reduction in an engine torque or power request, an engine torque or power output by more than a threshold amount, or a sudden speed increase of engine 30, any of which that vary from a nominal expected amount based on current operating conditions. Other engine operating conditions that can indicate a load shedding event can include, for example, emergency shutdown conditions, an operator input, an accelerator pedal position, a transmission status, and a clutch position. If conditional 204 is negative, procedure 200 ends at 214 and then resumes at start 202 for the next execution cycles, or stays in a mode for monitoring for load shed conditions until the procedure 200 ends.

Based on the detection of the load shedding event at operation 204, procedure 200 continues at operation 206 in which a number of cycles and/or cylinders in which to skip combustion of the fuel in cylinder(s) 34 of the engine 30 is determined in response to an air-fuel ratio or lambda limit in the exhaust flow.

In response to the determination in operation 206, procedure 200 continues at operation 208 to prevent combustion of the fuel in the at least one cylinder 34 during the number of cycles that have been calculated to be skipped. In one embodiment, operation 208 prevents combustion in all of the cylinders 34 during the cycles that are skipped. In another embodiment, operation 208 includes preventing combustion in only a portion of the cylinders 34, such as in only one cylinder bank 36a, 36b. In still another embodiment, operation 208 includes preventing combustion in only one of the cylinders 34.

Procedure 200 continues at operation 210 to combust fuel in the at least one cylinder when the number of skipped cycles are complete. In embodiments, in which the fuel is a gaseous fuel, operation 210 includes combusting the fuel each time the number of skipped cycles are complete and before the next number of cycles to skip is initiated by firing spark plug 80 in the at least one cylinder 34. In dual fuel engine embodiments, operation 210 includes combusting the gaseous fuel after the number of skipped cycles by injecting diesel fuel into the at least one cylinder. In certain embodiment, the number of skipped cycles is determined to be two or more cycles, and the two or more of skipped cycles are completed at least two times during the load shedding event so that the combustion event occurs each time one of the two or more skipped cycles is completed.

Procedure 200 continues at conditional 212 to determine if the load shedding event is complete. If conditional 212 is negative procedure 200 returns to operation 208 and continues as discussed above to prevent combustion in the one or more cylinders 34 during the number of cycles to be skipped determined in operation 206. If the load shedding event is complete, procedure 200 ends at 214.

Various aspects of the systems and methods disclosed herein are contemplated. For example, one aspect relates to a method for reducing and/or eliminating exhaust manifold over-pressure events and simultaneously reducing engine overspeeding for an operating an internal combustion engine system. The internal combustion engine system includes an intake system connected to an engine with at least one cylinder and at least one fuel source operably connected to the internal combustion engine system to provide a flow of fuel to the at least one cylinder to produce a torque output. The intake system is coupled to the at least one cylinder to provide a charge flow from the intake system to a combustion chamber of the at least one cylinder and an exhaust system. The method further includes determining a load shedding event associated with the internal combustion engine and, in response to determining the load shedding event, determining a number of cycles and/or in which cylinders to skip combustion of the fuel in response to an air-fuel ratio limit in the exhaust flow and preventing combustion of the fuel in the at least one cylinder during the number of skipped cycles and combusting the fuel in the at least one cylinder each time the number of skipped cycles are complete.

According to another aspect, a system is disclosed that includes an internal combustion engine including a plurality of cylinders, an exhaust system configured to receive exhaust from the plurality of cylinders, and an intake system configured to direct a charge flow to the plurality of cylinders. The system further includes a fuel system with at least one fuel source operable to provide a flow of fuel to the plurality of cylinders The system also includes a controller connected to the engine and the at least one fuel source. The controller is configured to determine a load shedding event associated with the engine while the engine is fuelled with the fuel and, in response to the load shedding event, determine a number of cycles in which to skip combustion of the fuel in at least one of the plurality of cylinders in response to an air-fuel ratio limit in the exhaust flow and prevent combustion of the fuel in the at least one cylinder during the determined number of skipped cycles and combust the fuel in the at least one cylinder each time the number of skipped cycles are complete.

Various embodiments of the systems and methods are contemplated. In one embodiment, the internal combustion engine system is operated by providing the flow of fuel from at least two fuel sources operably connected to the internal combustion engine system to provide a liquid fuel to the at least one cylinder and a flow of a gaseous fuel to the engine to produce a torque output. In a refinement of this embodiment, the liquid fuel is diesel fuel and the gaseous fuel is natural gas. In a further refinement, the fuel in the at least one cylinder is combusted by injecting diesel fuel into the at least one cylinder each time the number of skipped cycles are complete.

In another embodiment, the flow of fuel is gaseous fuel. In a refinement of this embodiment, the fuel is combusted by firing a spark plug in the at least one cylinder each time the number of skipped cycles are complete.

In yet another embodiment, the at least one cylinder includes a plurality of cylinders and prevention of combustion of the fuel in the at least one cylinder is performed for less than all of the plurality of cylinders. In still another embodiment, the at least one cylinder includes a plurality of cylinders and prevention of combustion of the fuel in the at least one cylinder is performed or controlled for all of the plurality of cylinders. In another embodiment, the method includes and/or the controller is configured to reduce the rate of the flow of fuel to the at least one cylinder in response to the load shedding event.

In another embodiment, the method includes and/or the controller is configured to prevent combustion of the fuel in all the plurality of cylinders during the determined number of skipped cycles. In still another embodiment, the plurality of cylinders form a first cylinder bank and a second cylinder bank, and the method includes and/or the controller is configured to prevent combustion of the fuel in only one of the first and second cylinder banks during the determined number of skipped cycles. In yet another embodiment, the number of skipped cycles includes at least two cycles and the number of skipped cycles are completed at least two times during the load shed event.

According to another aspect a controller apparatus is provided for operation with the engine described above. The controller apparatus includes a plurality of module including: a load shed event determination module configured to determine a load shedding event associated with the engine while the engine is fuelled with the fuel; a load shed response module configured to determine a plurality of cycles in which to skip combustion of the fuel in at least one of the plurality cylinders based on an air-fuel ratio limit in the exhaust flow; and a fuel control module configured to prevent combustion of the fuel in the at least one cylinder during the plurality of skipped cycles and to combust the fuel in the at least one cylinder each time the plurality of skipped cycles are complete.

In one embodiment, the plurality of skipped cycles are completed at least two times during the load shedding event and the fuel control module is configured to fire a spark plug in the at least one cylinder to combust the fuel in the at least one cylinder each time the plurality of skipped cycles are complete. In another embodiment, the plurality of skipped cycles are completed at least two times during the load shedding event and the fuel control module is configured to prevent combustion of the fuel in all the plurality of cylinders during the plurality of skipped cycles and combust the fuel in all the plurality of cylinders each time the plurality of skipped cycles are complete.

In one embodiment, the load shed response module is configured to determine the number of the plurality of cycles in which to skip combustion of the fuel in at least one of the plurality cylinders. In a further embodiment, the load shed response module is configured to determine the number of cylinders in which to skip combustion of the fuel for one or more cycles.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method for operating an internal combustion engine system, the internal combustion engine system including an intake system connected to an engine with at least one cylinder and at least one fuel source operably connected to the internal combustion engine system to provide a flow of fuel to the at least one cylinder, wherein the intake system is coupled to the at least one cylinder to provide a charge flow from the intake system to a combustion chamber of the at least one cylinder, the internal combustion engine system further including an exhaust system to receive an exhaust flow from the at least one cylinder, the method comprising:
reducing or eliminating exhaust manifold over-pressure events by
determining a load shedding event associated with the internal combustion engine; and
in response to determining the load shedding event:
determining a number of cycles in which to skip combustion of the fuel such that an air-fuel ratio limit in the exhaust flow is not violated;
preventing combustion of the fuel in the at least one cylinder during the number of skipped cycles to reduce or eliminate exhaust manifold over-pressure events; and
combusting the fuel in the at least one cylinder each time the number of skipped cycles are complete.

2. The method of claim 1, wherein combusting the fuel in the at least one cylinder includes firing a spark plug in the at least one cylinder each time the number of skipped cycles are complete.

3. The method of claim 1, wherein the at least one cylinder includes a plurality of cylinders and preventing combustion of the fuel in the at least one cylinder is performed for less than all of the plurality of cylinders.

4. The method of claim 1, wherein the at least one cylinder includes a plurality of cylinders and preventing combustion of the fuel in the at least one cylinder is performed for all of the plurality of cylinders.

5. The method of claim 1, wherein the number of skipped cycles includes at least two cycles and the number of skipped cycles are completed at least two times during the load shedding event.

6. The method of claim 1, wherein operating the internal combustion engine system includes providing the flow of fuel from at least two fuel sources operably connected to the internal combustion engine system to provide a liquid fuel to the at least one cylinder and a flow of a gaseous fuel to the engine to produce a torque output.

7. The method of claim 6, wherein the liquid fuel is diesel fuel and the gaseous fuel is natural gas.

8. The method of claim 7, wherein combusting the fuel in the at least one cylinder includes injecting diesel fuel into the at least one cylinder each time the number of skipped cycles are complete.

9. A system, comprising:
an internal combustion engine including a plurality of cylinders;
an exhaust system configured to receive an exhaust flow from the plurality of cylinders;
an intake system configured to direct a charge flow to the plurality of cylinders;
a fuel system including at least one fuel source operable to provide a flow of fuel into the charge flow to the plurality of cylinders; and
a controller connected to the engine and the at least one fuel source, wherein the controller is configured to reduce or eliminate exhaust manifold over-pressure events by
determining a load shedding event associated with the engine while the engine is fuelled with the fuel to produce a torque output and, in response to the load shedding event,
determine a number of cycles in which to skip combustion of the fuel in at least one of the plurality of cylinders such that an air-fuel ratio limit in the exhaust flow is not violated,
prevent combustion of the fuel in the at least one cylinder during the determined number of skipped cycles to reduce or eliminate exhaust manifold over-pressure events, and
combust the fuel in the at least one cylinder each time the number of skipped cycles are complete.

10. The system of claim 9, wherein the controller is configured to fire a spark plug in the at least one cylinder to combust the fuel in the at least one cylinder each time the number of skipped cycles are complete.

11. The system of claim 9, wherein the controller is configured to prevent combustion of the fuel in all the plurality of cylinders during the determined number of skipped cycles.

12. The system of claim 9, wherein the fuel is a gaseous fuel.

13. The system of claim 12, wherein the at least one fuel source includes a first fuel source for providing the gaseous fuel into the charge flow upstream of the plurality of cylinders and a second fuel source for providing a liquid fuel into the plurality of cylinders.

14. The system of claim 13, wherein the controller is configured to inject the liquid fuel into the at least one cylinder to combust the gaseous fuel in the at least one cylinder each time the number of skipped cycles are complete.

15. The system of claim 13, wherein the number of skipped cycles is at least two cycles and the number of skipped cycles are completed at least two times during the load shedding event.

16. An apparatus, comprising:
an electronic controller operatively connected with an internal combustion engine including a plurality of cylinders, the internal combustion engine connected to an exhaust system configured to receive exhaust from the plurality of cylinders and an intake system configured to direct a charge flow to the plurality of cylinders, the electronic controller further being operatively connected with a fuel system including at least one fuel source operable to provide a flow of fuel into the charge flow to the plurality of cylinders upstream of the cylinders, the electronic controller being configured to reduce or eliminate exhaust manifold over-pressure events, the controller including:
a load shed event determination module configured to determine a load shedding event associated with the engine while the engine is fuelled with the fuel;
a load shed response module configured to determine a plurality of cycles in which to skip combustion of the fuel in at least one of the plurality cylinders such that an air-fuel ratio limit in the exhaust flow is not violated; and
a fuel control module configured to prevent combustion of the fuel in the at least one cylinder during the plurality of skipped cycles to reduce or eliminate exhaust manifold over-pressure events, and to combust the fuel in the at least one cylinder each time the plurality of skipped cycles are complete.

17. The apparatus of claim 16, wherein the plurality of skipped cycles are completed at least two times during the load shedding event and the fuel control module is configured to fire a spark plug in the at least one cylinder to combust the fuel in the at least one cylinder each time the plurality of skipped cycles are complete.

18. The apparatus of claim 16, wherein the plurality of skipped cycles are completed at least two times during the load shedding event and the fuel control module is configured to prevent combustion of the fuel in all the plurality of cylinders during the plurality of skipped cycles and combust the fuel in all the plurality of cylinders each time the plurality of skipped cycles are complete.

19. The apparatus of claim 16, wherein the load shed response module is configured to determine a number of the plurality of cylinders in which to skip combustion of the fuel as follows:

$$y = \frac{(\lambda_2 - \lambda_3)(\lambda_1 \times A + 1)}{(\lambda_2 - \lambda_1)(\lambda_3 \times A + 1)} \text{ and } n = \lfloor yN \rfloor$$

where y is equal to or between 0 and 1 and is the fraction of the total exhaust mass flow from the skipped cylinders, A is the stoichiometric air-fuel ratio for the fuel, $\lambda_1$ is the excess air ratio of the skipped cylinders, $\lambda_2$ is the excess air ratio in the fired cylinders, $\lambda_3$ is the excess air ratio for the plurality of cylinders, N is the total number of cylinders, and n is the number of cylinders to be skipped.

20. The apparatus of claim 16, wherein the load shed response module is configured to determine a number of the plurality of cylinders in which to skip combustion of the fuel as follows:

$$y^* = \frac{\lambda_1 \times A + 1}{\lambda_3 \times A + 1} \text{ and } n^* = \lfloor y^* N \rfloor$$

where y* is equal to or between 0 and 1 and is the fraction of the total exhaust mass flow from the skipped cylinders, A is the stoichiometric air-fuel ratio for the fuel, $\lambda_1$ is the excess air ratio of the skipped cylinders, $\lambda_3$ is the excess air ratio for the combined cylinders, N is the total number of cylinders, and n* is the number of cylinders to be skipped.

21. A system, comprising:
an internal combustion engine including a plurality of cylinders;
an exhaust system configured to receive an exhaust flow from the plurality of cylinders;
an intake system configured to direct a charge flow to the plurality of cylinders;
a fuel system including at least one fuel source operable to provide a flow of fuel into the charge flow to the plurality of cylinders; and
a controller connected to the engine and the at least one fuel source, wherein the controller is configured to reduce or eliminate one or more of an exhaust manifold over-pressure event and engine overspeeding by
determining a load shedding event associated with the engine while the engine is fuelled with the fuel to produce a torque output and, in response to the load shedding event, determine a number of cycles in which to skip combustion of the fuel in at least one of the plurality of cylinders in response to an air-fuel ratio limit in the exhaust flow and prevent combustion of the fuel in the at least one cylinder during the determined number of skipped cycles and combust the fuel in the at least one cylinder each time the number of skipped cycles are complete, wherein the plurality of cylinders form a first cylinder bank and a second cylinder bank, and the controller is configured to prevent combustion of the fuel in only one of the first and second cylinder banks during the determined number of cycles.

\* \* \* \* \*